US012651585B2

(12) United States Patent
Cooke

(10) Patent No.: US 12,651,585 B2

(45) **Date of Patent: *Jun. 9, 2026**

(54) TONAL MUSICAL INSTRUMENTS FOR OUTDOOR INSTALLATION

(71) Applicant: PlayCore Wisconsin, Inc., Chattanooga, TN (US)

(72) Inventor: Richard Cooke, Hesperus, CO (US)

(73) Assignee: PLAYCORE WISCONSIN, INC., Chattanooga, TN (US)

( * ) Notice: Subject to any disclaimer, the term of this patent is extended or adjusted under 35 U.S.C. 154(b) by 225 days.

This patent is subject to a terminal disclaimer.

(21) Appl. No.: 18/512,505

(22) Filed: Nov. 17, 2023

(65) Prior Publication Data

US 2024/0087545 A1 Mar. 14, 2024

Related U.S. Application Data

(63) Continuation of application No. 17/854,789, filed on Jun. 30, 2022, now Pat. No. 12,002,441, which is a continuation of application No. 16/843,207, filed on Apr. 8, 2020, now Pat. No. 11,410,636, which is a continuation of application No. 16/221,024, filed on Dec. 14, 2018, now Pat. No. 10,650,793.

(60) Provisional application No. 62/599,400, filed on Dec. 15, 2017.

(51) Int. Cl.

| | |
|---|---|
| ***G10D 13/12*** | (2020.01) |
| ***G10D 13/08*** | (2020.01) |
| ***G10G 5/00*** | (2006.01) |
| ***G10H 1/06*** | (2006.01) |

(52) U.S. Cl.

CPC ............ *G10G 5/005* (2013.01); *G10D 13/08* (2013.01); *G10D 13/12* (2020.02); *G10G 5/00* (2013.01); *G10H 1/06* (2013.01)

(58) Field of Classification Search

CPC .......... G10G 5/005; G10G 5/00; G10D 13/08; G10D 13/12; G10D 13/00; G10H 1/06

See application file for complete search history.

(56) References Cited

U.S. PATENT DOCUMENTS

| | | | | |
|---|---|---|---|---|
| 3,673,909 | A | 7/1972 | Bimkrant | |
| 4,949,385 | A | 8/1990 | Murphy | |
| 5,902,945 | A | 5/1999 | Nakano et al. | |
| 7,534,949 | B1 | 5/2009 | Estes | |
| 12,002,441 | B2 * | 6/2024 | Cooke | G10G 5/00 |
| 2017/0110100 | A1 | 4/2017 | Keller | |

OTHER PUBLICATIONS https://www.youtube.com/watch?v=xSOcjbY3Mnw Harmony Park, Nov. 7, 2017.

* cited by examiner

*Primary Examiner* — Kimberly R Lockett

(74) *Attorney, Agent, or Firm* — McAndrews, Held & Malloy, Ltd.

(57) ABSTRACT

Tonal musical instruments configured for outdoor installation are disclosed. The tonal musical instrument may comprise a support post, wherein the support post is configured for attachment to an outdoor surface, at least one a non-vibrating guard, a metal plate tuned to produce at least one note on a musical scale when struck by a user, and one or more fasteners securing the at least one non-vibrating guard and the metal plate to the support post.

19 Claims, 8 Drawing Sheets

TONAL MUSICAL INSTRUMENTS FOR OUTDOOR INSTALLATION

RELATED APPLICATIONS

This application is a continuation of U.S. patent application Ser. No. 17/854,789, filed on Jun. 30, 2022, which is a continuation of U.S. patent application Ser. No. 16/843,207, filed Apr. 8, 2020 and issued as U.S. Pat. No. 11,410,636, which is a continuation of U.S. patent application Ser. No. 16/221,024, filed Dec. 14, 2018 and issued as U.S. Pat. No. 10,650,793, which claims priority to and benefit of U.S. provisional patent application No. 62/599,400, filed Dec. 15, 2017, all of which are herein incorporated by reference in their entireties.

BACKGROUND

Music is a global, artistic language that creates community, connection and a sense of belonging. Some studies suggest that music is older than speech and language, and that speech may have even evolved from music. The primal power of music evokes emotions, memories, and images, taking the participant on a magical journey.

Research has shown that musical play is a key component of development in children. Music helps to build reasoning skills and cognitive development. It can increase the capacity of one's memory, refine time management and organizational skills, and teach perseverance. Playing music builds confidence, encourages creativity and self-expression. It can reduce anxiety, relieve symptoms of depression, and elevate one's mood. The Brain and Creativity Institute found that musical experiences in childhood can accelerate brain development, particularly in the areas of language acquisition and reading skills.

Research has also shown that being outside enhances a child's development. Nature is important to children's development in every major way—intellectually, emotionally, socially, spiritually and physically. Kellert, Stephen R., "Nature and Childhood Development," In *Building for Life: Designing and Understanding the Human-Nature Connection*, Island Press, 2005. "Experience of the outdoors has the potential to confer a multitude of benefits on young people's physical development, emotional and mental health and well-being and societal development. Mental health and wellbeing benefits from play in natural settings appear to be long-term, realized in the form of emotional stability in young adulthood." Travlou, Penny, "Wild Adventure Space For Young People," *OPENspace Individual Literature Reviews* (2006).

As such, instruments placed in outdoor learning environments enable "children to explore natural sounds in the environment, make loud music, compose music individually and collaboratively, and move expressively." Spencer, Karin H, et al., Quality Outdoor Play Spaces for Young Children, *Young Children*, pp 28-34 (2014).

However, many outdoor instruments are atonal and traditional instruments are not constructed in a manner to withstand extreme outdoor conditions.

BRIEF SUMMARY

Embodiments of the tonal musical instruments of the present disclosure comprise a support post configured to be mounted to an outdoor surface so as to extend from that surface and a metal plate tuned to produce at least one musical note when struck by a user. The metal plate may be secured to the support post by one or more fasteners. In some embodiments, the instrument may also comprise a non-vibrating guard. For instance, in some embodiments, the metal plate may be secured between the support post and a non-vibrating guard.

The instrument may also comprise one or more mallets that a user may use to strike the metal plate to produce the musical note. Each mallet may be attached to the instrument by a cable, which may be either a retractable cable or a non-retractable cable. In some embodiments, for instance, one or more mallets may be attached to a portion of the support post. In other embodiments, one or more mallets may be attached to an additional structure, such as a mallet-support structure. In some embodiments, the mallet(s) may be attached to the instrument or to the mallet-support structure through a tamper-resistance connection in order to protect against the removal of the mallet(s).

In some embodiments, the metal plate may comprise a plurality of segments, each segment being independently tuned to produce a different musical note when struck by a user. For example, in some embodiments, the metal plate may comprise four segments tuned to produce four different musical notes. The four segments may be located in different directions around an end of the support post, e.g., a first segment at the upper left side, a second segment at the upper right side, a third segment at the lower right side, and a fourth segment at the lower left side. For example, in some embodiments, the combination of the metal plate and the support post, and optionally the non-vibrating guard, may replicate a flower or a four-leaf clover.

In some embodiments, each segment of the metal plate may be configured to produce a different musical note by providing each segment with a slightly different size (e.g., different surface area). In some embodiments, the rear surface of each segment may also be milled, i.e., metal may be removed from the rear surface in a controlled manner to sharpen or flatten the note produced by the segment. In some embodiments, the notes produced by each segment of a metal plate may be from the same musical scale (e.g., C-major, etc.). Each note may desirably be at least 90% accurate (e.g., as measured by a tuner), more preferably at least 95% accurate, more preferably at least 98% accurate, more preferably at least 99% accurate.

In some embodiments, the tonal musical instrument may comprise multiple metal plates extending from the same support post. Each of the multiple metal plates may be configured to produce a single musical note, or each of the multiple metal plates may be configured to produce more than one musical note. In some embodiments, the notes produced by each metal plate may be from the same musical scale (e.g., C-major, etc.). Each note may desirably be at least 90% accurate (e.g., as measured by a tuner), more preferably at least 95% accurate, more preferably at least 98% accurate, more preferably at least 99% accurate.

In some embodiments, the tonal musical instruments are configured to withstand prolonged outdoor use. For instance, the instruments can endure various atmospheric states including, but not limited to, heat, cold, dryness, sunshine, wind, rain, and snow. For example, one or more of the components, such as the metal plate or plates, and/or one or more of the exposed connections may be resistant to water damage. In some embodiments, for example, the metal plate may be aluminum. The instruments may also be configured to endure frequent hard play. The tonal musical instruments may be designed for durability and require minimal to no maintenance. Even with regular use, the metal plates may maintain their tonal quality with no need for retuning.

In additional to withstanding the stresses of outdoor installation, the tonal musical instruments designs may incorporate various features to promote a player's enjoyment and satisfaction. These features include: providing an ergonomic design that promotes ease of play, providing a combination of notes that sound good together (their being from the same musical scale), and configuring the instrument to achieve an accurate and sustained note or notes.

The ergonomic design of the tonal musical instruments may be configured to allow for ease of play. By providing a large surface area to be struck by a player, the ability to consistently produce musical notes and to create melodies from those notes will either come naturally or is easily developed for people of all ages and skills. Moreover, in some embodiments, regardless of whether a player strikes the instrument in the middle of a metal plate (or segment of a metal plate) or near the edge, the note may resonate in substantially the same manner. Additionally, each instrument may have a mallet that is easy to use and designed to produce the fullest sound from each note. The instruments may also be placed at an angle, for maximum ease of play by children, adults, elders, and people with disabilities.

The tonal musical instruments may, in some embodiments, allow for a user to produce a combination of notes that work together—creating harmonious and complementary sounds. The different notes may be created by providing a metal plate having multiple segments, with each segment being configured to produce a musical note, and/or by providing multiple metal plates, each of which is configured to produce one or more musical notes. The different notes may all be part of the same musical scale, ensuring that the notes do not conflict with one another. This may facilitate the playing of pleasant and enjoyable sound combinations.

In some embodiments, the tonal musical instruments may be configured so that the musical note or notes may be sustained long after the striking of the metal plate. This may be achieved by vibration of the metal plate itself and does not require the use of any additional elastomeric materials. Accordingly, the metal plates may be described as being "self-sustaining" for a desired duration. When notes are sustained longer, players can hear the harmonies that are created as they strike the different notes; they don't have to play fast. This makes it relatively easy for a user to create enjoyable melodies. Additionally, the experience may be more gratifying because the sound lasts longer. In some embodiments, for instance, the notes may be sustained for 5 seconds or longer, alternatively 10 seconds or longer, alternatively 15 seconds or longer, alternatively 20 seconds or longer, alternatively 25 seconds or longer, alternatively 30 seconds or longer.

In some embodiments, the tonal musical instruments may be configured to replicate commonly recognizable objects, thereby increasing the level of surprise and enjoyment at hearing musical notes caused by striking various portions of the object. For instance, the instrument may take on various shapes including shapes consistent with outdoor or natural themes or objects, such as flowers, trees, other plants, mushrooms, animals, insects, butterflies, and the like. The instrument may also take on a variety of other custom shapes, such as may be desirable to be consistent with thematic playground installations, e.g., pirate ships, castles, hearts, and the like.

In some embodiments, the metal plate may be shaped so as to have a periphery having the shape of a flower, a flower corolla, one or more flower petals, a shamrock, one or more leaves, one or more branches of a tree, or a combination thereof. The metal plate or plates may also be positioned on the support post in a manner that replicates the look of a plant, flower, or tree. Finally, the support post may be configured to resemble a portion of a plant, flower, or tree, such as a flower stem, a tree trunk, a central stalk of a plant, or the like.

Features of the tonal musical instruments may allow for individual and group play. For instance, using embodiments of the tonal musical instruments described herein, complex combinations of notes can be created by having multiple individuals play either a single instrument or multiple instruments positioned in proximity to one another at the same time—similar to the way various instruments in an orchestra come together to form one cohesive, beautiful piece of music.

In some embodiments, the tonal musical instrument comprises a support post, wherein the support post is configured for attachment to an outdoor surface, at least one a non-vibrating guard, a metal plate tuned to produce at least one note on a musical scale when struck by a user, and one or more fasteners securing the at least one non-vibrating guard and the metal plate to the support post.

In another embodiment, the metal plate comprises a plurality of segments, each segment being tuned to produce at least one note on a musical scale when struck by a user. In another embodiment, the metal plate comprises a plurality of segments, each segment being tuned to produce a different note on a musical scale than the other segments when struck by a user.

In a further embodiment, the metal plate comprises four segments tuned to produce at least four different notes on a musical scale. In yet a further embodiment, each segment has a different surface area. In a further embodiment, a rear surface of each segment is independently milled to provide each note. In yet another embodiment, at least one segment can be used as a handle. In some embodiments, the tonal musical instrument comprises a plurality of metal plates tuned to produce different notes on a musical scale. In another embodiment, the different notes are within the same musical scale.

In some embodiments, the metal plate comprises a periphery having a shape of a natural object. In a further embodiment, the shape is selected from the group consisting of a flower, a flower corolla, one or more flower petals, a shamrock, one or more leaves, one or more branches of a tree, a butterfly, or a combination thereof.

In some embodiments, the metal plate comprises a periphery having a shape of a fanciful object. In a further embodiment, the shape is selected from the group consisting of a heart, a pirate ship, a castle, a flag, scull and/or crossbones, or a combination thereof.

In some embodiments, the metal plate comprises aluminum. In another embodiment, the metal plate is aluminum.

In some embodiments, a rear surface of the metal plate is milled to provide one or more musical notes. In another embodiment, the metal plate has a note accuracy of at least 90%. In yet another embodiment, the note is sustained for at least 5 seconds when the metal plate is struck by a user. In a further embodiment, the note is sustained for at least 15 seconds when the metal plate is struck by a user.

In some embodiments, the tonal musical instrument further comprises at least one mallet. In yet another embodiment, the mallet is attached to the support post by a cable.

In some embodiments, the non-vibrating guard comprises high-density polyethylene (HDPE), polyethylene high-density (PEHD), or metal. In another embodiment, the non-vibrating guard comprises at least a front guard and a rear guard. In yet another embodiment, the one or more fasteners is selected from the group consisting of screws and bolts. In yet a further embodiment, the one or more fasteners are placed through the metal plate, the non-vibrating guard, and a mounting plate of the support post.

In some embodiments, the support post is permanently attached to the ground or a playground surface.

DETAILED DESCRIPTION

Tonal musical instruments configured for outdoor installation are disclosed. These instruments may be near-perfectly tuned and make musical expression accessible to everyone, regardless of age, ability or musical training. The simplest of motor skills are needed to activate pure harmonies, providing enjoyment for all players. The tonal musical instruments are also configured to withstand various outdoor environments.

In one embodiment the tonal musical instrument comprises at least one metal plate, at least non-vibrating guard, and at least one support post.

Figure 1:
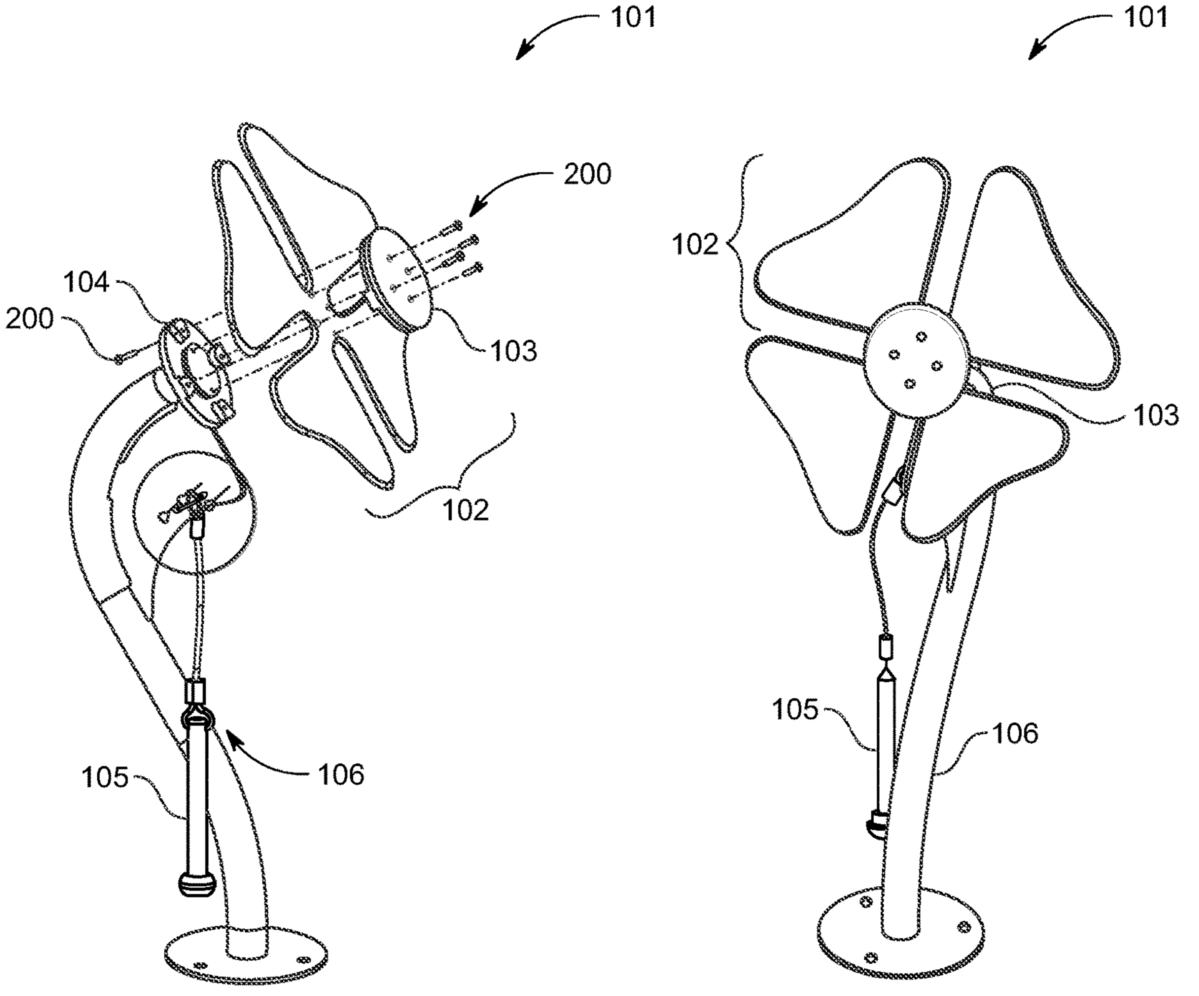
FIG. 1 depicts a tonal musical instrument in the shape of a flower in accordance with one embodiment of the invention.

FIG. 1 depicts a tonal musical instrument in accordance with one embodiment of the present disclosure. In the illustrated embodiment, the tonal musical instrument has the shape and appearance of a flower. In the embodiment illustrated in FIG. 1, the flower-shaped tonal musical instrument 101 comprises a metal plate 102, a non-vibrating front guard 103, a non-vibrating back guard 104, a mallet 105, and a support post 106.

In some embodiments the height of the flower shaped tonal musical instrument 101 (from the base of the support post to the top of the metal plate) is at least 39 inches, alternatively at least 40 inches, alternatively at least 41 inches, alternatively at least 42 inches, alternatively at least 43 inches, alternatively at least 44 inches, alternatively at least 45 inches, alternatively at least 46 inches, alternatively at least 47 inches, or alternatively at least 48 inches.

In some embodiments, the depth of the flower shaped tonal musical instrument 101 (from the base of the support post to the top of the metal plate) is at least 11 inches, alternatively at least 12 inches, alternatively at least 13 inches, alternatively at least 14 inches, or alternatively at least 15 inches.

Figure 2:
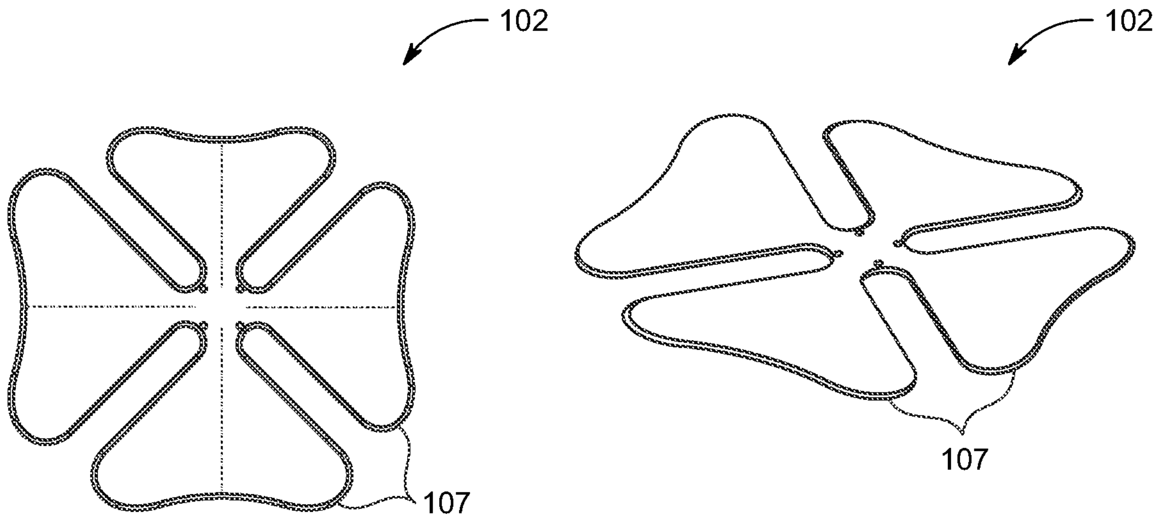
FIG. 2 depicts an aluminum plate in the shape of petals of a flower in accordance with one embodiment of the invention.

FIG. 2 depicts a metal plate 102 in accordance with one embodiment of the invention. In the illustrated embodiment, the metal plate 102 is cut to resemble the petals of a flower, collectively known as the corolla. In other embodiments, the metal plate 102 may be cut to resemble other natural forms including, but not limited to petals, leaves, plants, branches, or other foliage. In some embodiments the width of the metal plate 102 is at least 19 inches, alternatively at least 20 inches, alternatively at least 21 inches, alternatively at least 22 inches, alternatively at least 23 inches, alternatively at least 24 inches, alternatively at least 25 inches, or alternatively at least 26 inches, In some embodiments, the metal plate 102 has at least one segment 107 that will produce a note on a musical scale when stuck by a user. In some embodiments, the metal plate 102 has at least two segments 107 wherein each segment 107 produces at least one different note on a musical scale when stuck by a user. In some embodiments, such as that illustrated in FIGS. 1 and 2, the metal plate 102 may have four segments 107 wherein each segment 107 produces at least one different note on a musical scale when stuck by a user. In some embodiments, the segments 107 may be of the same or substantially the same shape but may have different sizes. The different sizes of the segments 107 may provide for the production of different notes when struck by a user. In some embodiments, it may be desirable that the differences in size are relatively small compared to the overall size of the segments, such that the different segments have substantially similar appearances. In some embodiments, the segments 107 are arranged wherein the smallest segments 107 are at the bottom of the metal plate 102. This effect is shown for example in FIGS. 1 and 2, where the different "petal" sizes do not detract from the overall appearance of the metal plate as being a flower corolla.

In some embodiments, the notes produced by the instrument may all be within the same musical scale. In some embodiments, for example, the notes produced by the tonal musical instrument may fall within a pentatonic scale. A pentatonic scale is a musical scale with five notes per octave. Because of its relative simplicity, this scale may be used to introduce beginners to music. It is also common in many types of traditional music. In some embodiments, the notes produced by the tonal musical instrument may fall within a heptatonic scale, which is the most common 7-note scale used in Western music. In other embodiments, the notes produced by the tonal musical instrument may be of a diatonic scale, a tritonic scale, a tetratonic scale, a hexatonic scale, or an octatonic scale.

In some embodiments, a single metal plate 102 is used to produce each of the musical notes, such as through the incorporation of a plurality of segments 107. The use of a single metal plate 102 may reduce material costs and, in some instances may result in a more realistic biomimicry form.

In some embodiments, the metal plate 102 may be prepared by cutting from a sheet of metal, e.g., sheet aluminum. For instance, the metal plate may be cut by sawing, shearing, or chiseling (all with manual and powered variants); torching with hand-held torches (such as oxy-fuel torches or plasma torches); or via computer numerical control (CNC) cuts (using a laser, mill bits, torch, or water jet). In some embodiments, the metal plate 102 is at least ¼ in thick. In some embodiments, the metal plate 102 has rounded perimeter edges. In a further embodiment, the rounded edges are at least ⅛ in thick. In yet another embodiment, at least one hole 108 is drilled in the metal plate 102, preferably near the center or end of the metal plate 102. In the embodiment depicted by FIG. 2, for example, there are four holes 108 drilled near the center of the metal sheet. In the embodiment depicted in FIG. 6, on the other hand, there are two holes drilled near the end of the metal sheet.

In some embodiments, the metal plate may be an aluminum plate. Moreover, the surface of the aluminum plate may be anodized to provide corrosion resistance and/or a decorative finish.

In some embodiments, the metal plate 102 and/or the individual segments 107 of the metal plate may be tuned by milling a rear surface of the metal plate. Milling is the process of cutting or scraping to remove material from a metal surface. This milling process allows for the ability to make minute adjustments to the thickness of the metal plate 102 and/or the individual segments 107.

This milling process allows for accurate tuning of the tonal musical instrument. For instance, in order to increase the sharpness of the sound being produced, one may mill from the outer edge of the note-producing metal plate 102 or segment 107 toward the center of the note-producing metal plate or segment. Alternatively, in order to increase the flatness of the sound being produced, one may mill from the center of the note-producing metal plate 102 or segment 107 toward the outer edge of the note-producing metal plate or segment. Tuning of the instrument through milling may be accompanied and facilitated by the use of an electronic tuner or the like.

This allows for the production of very tonally accurate note-producing metal plates 102 and segments 107. In some embodiments, for instance, the tonal musical instruments may have a tonal note accuracy of at least 90%, preferably 95%, and more preferably 99%. This milling process is a unique and novel technique for tuning instruments for outdoor use. Fine tune milling allows for the achievement of a precise musical note on the tonal scale, rather than the typical atonal chimes found in conventional outdoor instruments. Furthermore, the tonal musical instruments will maintain the tonal accuracy throughout its outdoor exposure.

In some embodiments, the tonal notes are randomized on the metal plates 102 or segments 107. In another embodiment, the tonal notes are ordered by increasing pitch on the metal plates 102 or segments 107. And in yet another embodiment, the tonal notes are ordered by decreasing pitch on the metal plates 102 or segments 107.

Figure 3:
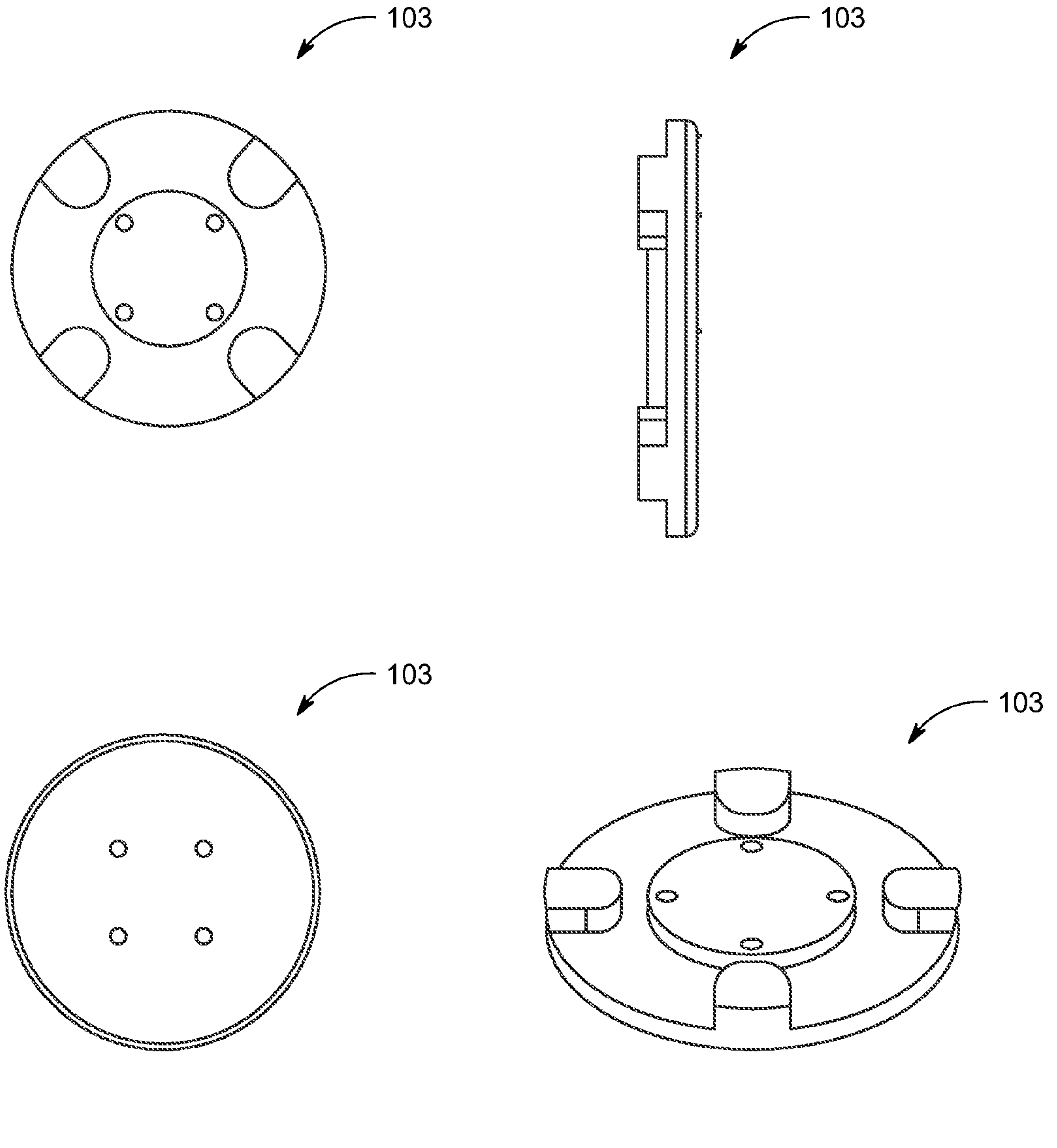
FIG. 3 depicts a front guard in accordance with one embodiment of the invention.
Figure 4:
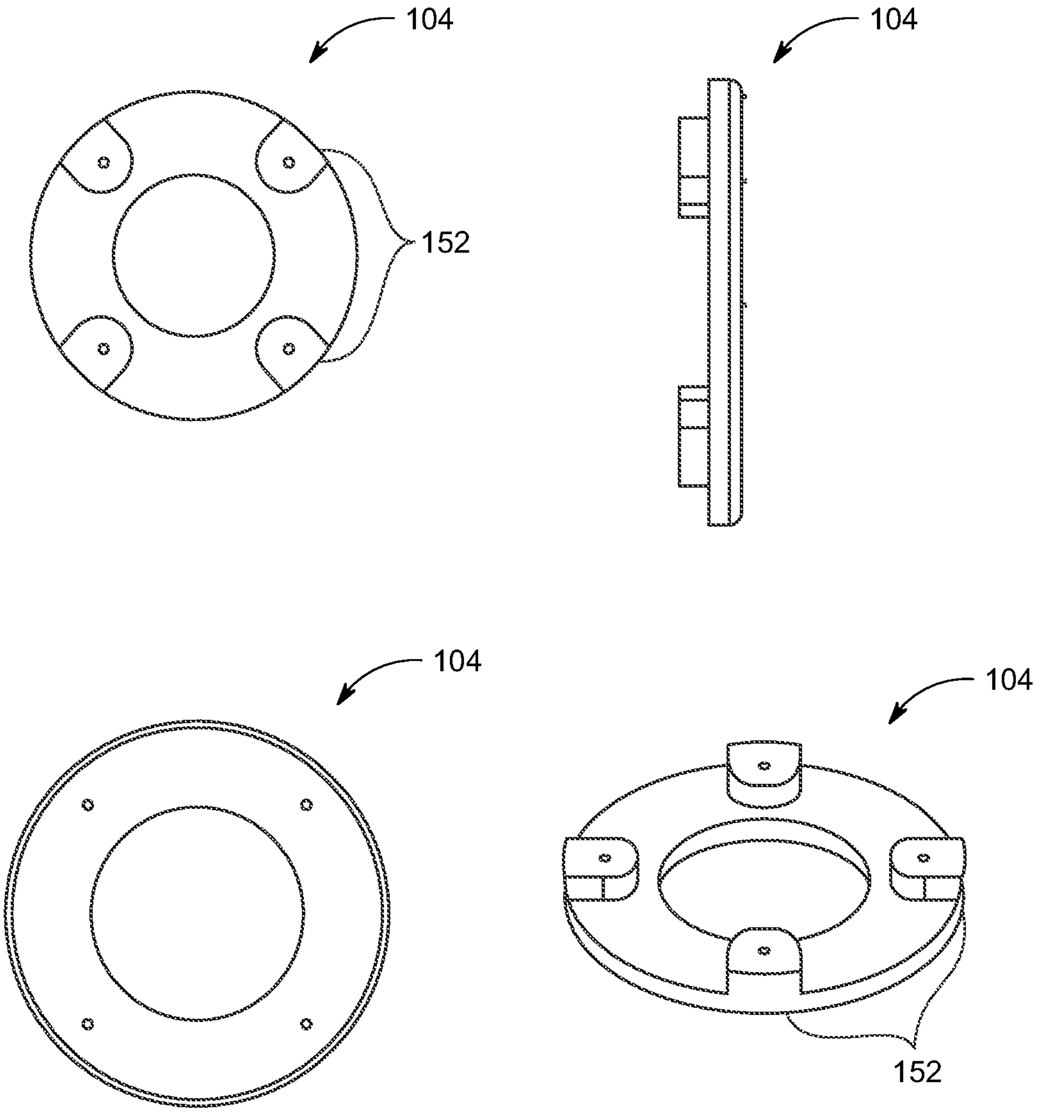
FIG. 4 depicts a back guard in accordance with one embodiment of the invention.

In some embodiments, the tonal musical instrument 101 may further comprise at least one non-vibrating element. In some embodiments, the non-vibrating element may comprise a front guard 103. In yet another embodiment, the non-vibrating element may comprise a back guard 104. In yet a further embodiment, both the front guard 103 and back guard 104 may be present. Embodiments of the front and rear guards 103, 104 are shown in FIGS. 3 and 4. In some embodiments, the non-vibrating elements allow for the sounds from the tonal musical instrument to be sustained in the absence of elastomeric components. In some embodiments, the addition of elastomeric material may be used for non-vibrating elements in order to preserve the non-vibrating characteristics. In some embodiments, there are elastomeric components between the non-vibrating element and metal plate 102. In some embodiment, the elastomeric components are synthetic or natural rubber.

In some embodiments, the front guard 103 may be plastic. In other embodiments the front guard 103 may be thermoplastic, including, but not limited to High-density polyethylene (HDPE) or polyethylene high-density (PEHD). In yet another embodiment the front guard 103 comprises an inner hub and an outer hub. In some embodiments, the outer hub is at least ⅜ in thick. In some embodiments, the inner hub is at least ⅝ in thick. In some embodiments, the front guard 103 comprises at least one hole. In yet another embodiment the front guard 103 may comprise four holes. The holes may allow for the attachment of the front guard 103 to the metal plate 102 and/or the support post 106.

In some embodiments the front guard 103 is metal. In another embodiment, the front guard has a rectangular portion with at least one hole which allows for the attachment of the front guard 103 to the metal plate 102 and/or the support post 106.

In yet another embodiment the tonal musical instrument 101 comprises a back guard 104 may be plastic. In other embodiments the back guard 104 may be thermoplastic, including, but not limited to High-density polyethylene (HDPE) or polyethylene high-density (PEHD). In yet another embodiment the back guard 104 has raised sections that are at least ¾ in thick. In some embodiments, the back guard 104 comprises at least one hole. In yet another embodiment the back guard 104 may comprise four holes, wherein the holes are evenly distributed on the raised sections 152. The holes may allow for the attachment of the front guard 103 to the metal plate 102 and/or the support post 106.

In some embodiments, the back guard 104 is metal. In another embodiment, the front guard has a rectangular portion with at least one hole which allows for the attachment of the back guard 104 to the metal plate 102 and/or the support post 106.

In some embodiments, the front guard 103 and back guard 104 are pre-attached to the metal plate 102.

Embodiments of the tonal musical instrument produce notes that are sustained for a relatively long period of time. For example, in some embodiments, the rear surface of the metal plate 102 and/or the individual segments of a metal plate 107 may be configured to have a specific curvature, which provides for a sustained vibration of the plate and thus a sustained resonation of sound. Most instruments which have sustained notes require a separate sustainer, which typically comprises one or more elastomeric elements, to extend the sound when a note on an instrument is played. However, the tonal musical instruments of the present disclosure provide a self-sustained sound in the absence of any additional elastomeric component. For example, in some embodiments, the non-vibrating guard allows the metal sheet 102 to be hard bolted to a support post 106 which eliminates the need for any elastomeric components to sustain sound by restricting the movement of the sound waves.

In some embodiments, for example, the sounds can be sustained for at least 5 seconds, alternatively at least 10 seconds, alternatively at least 15 seconds, alternatively at least 20 seconds, alternatively at least 25 seconds. In yet another embodiment the sounds can be sustained for up to 30 seconds.

Figure 5:
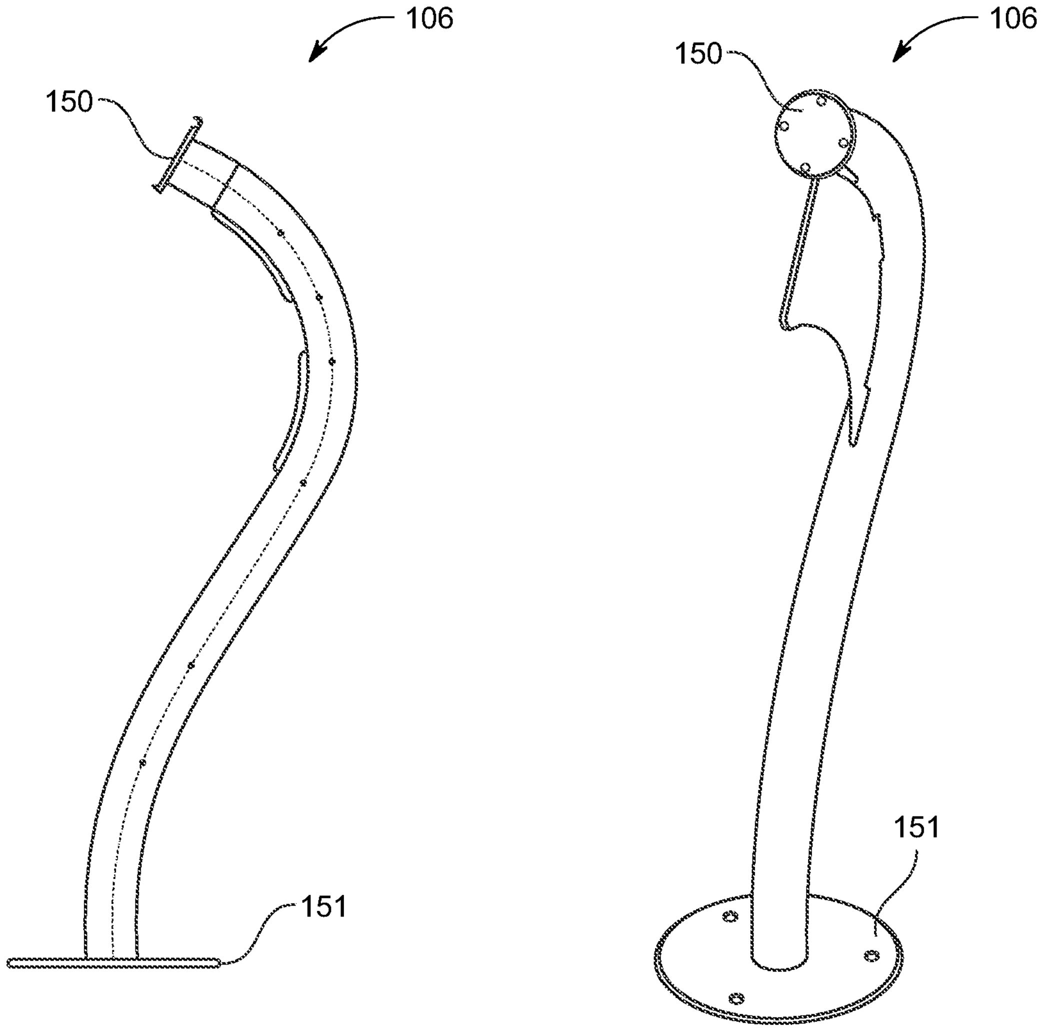
FIG. 5 depicts a support post in accordance with one embodiment of the invention.

The tonal musical instrument 101 may also comprise a support post 106. In some embodiments, such as the embodiment illustrated in FIG. 5, the support post 106 may comprise an upper mounting plate 150, to which the metal plate may be mounted, and a lower base plate 151. In some embodiments, the mounting plate 150 may be configured to be non-vibrating. For instance, in the embodiment illustrated in FIG. 5, the upper end of the support post 106 comprises a mounting plate 150. The bottom end of the support post 106 comprises a base plate.

In some embodiments, the support post 106 may be metal, including, but not limited to, steel. In some embodiments, for example, the support post 106 may comprise a galvanized steel pipe. In another embodiment, the support post 106 may be a powder coated steel frame.

In some embodiments, the support 106 post may extend vertically from the ground or playground surface to which it is installed, thereby placing the one or more metal plates 102 at a desired elevation for striking by users of varying heights. In some embodiments, the support post 106 may be straight. In other embodiments, the support post 106 may be curved or angled so as to place a mounting plate 150, and hence the metal plate or plates 102, at a desirable angle.

In some embodiments, the mounting plate 150 may comprise one or more apertures. The one or more apertures may be configured for attachment of the support post 106 to one or more of the metal sheet 102, front guard 103, and the back guard 104. In some embodiments, the mounting plate 150 is permanently connected to the support post 106, such as through welding.

In some embodiments, the base plate 151 may comprise one or more apertures. The one or more apertures allow for attachment of the support post 106 to an outdoor surface including, but not limited to, the ground or composite materials such as concrete or another surfacing, including playground surfacing. In some embodiments, the support post 106 is attached semi-permanently to the ground or a secondary surface. In yet another embodiment the support post 106 is attached permanently to the ground or a secondary surface. This attachment allows for the tonal musical instrument to withstand the outdoor environment and protects the instrument from theft or vandalism. In yet another embodiment the support post is attached to a concrete pad. In some embodiment the concrete pad is at least 16 inches long, at least 16 inches wide and at least 6 inches thick. If the concrete pad is at an angle, spacers or shims, including, but not limited to steel washers, are used.

The tonal musical instrument 101 may also comprise one or more mallets 105. In some embodiments, each mallet may be attached to the support post 106, such as through a cable. In some embodiments, the head of the mallet 105 may be plastic. For example, in some embodiments, the head of the mallet 105 may be polyurethane. In some embodiments, the head of the mallet may have a durometer between about 60 and about 80, alternatively between about 65 and about 75. In some embodiments, the head of the mallet may have a durometer of about 70.

Some embodiments of the tonal musical instrument 101 comprise, a support post 106, wherein the support post 106 is configured for attachment to an outdoor surface, a non-vibrating back guard 104, a metal plate 102 tuned to produce at least one note on a scale, a non-vibrating front guard 103, and a fastener 200, wherein the fastener 200 is placed through the front guard 103, metal plate 102, and back guard 104 to secure the components to the support post 106. In some embodiments, the fastener 200 can include but is not limited to, screws and/or bolts. This unique attachment allows for the vibrating metal plate 102 to be attached to the non-vibrating front 103 and back 104 guards rather than direct attachment to the support post 106. This attachment can be permanent or semi-permanent. In some embodiments, one or more mallets 105 may be further attached to the support post.

Figure 6:
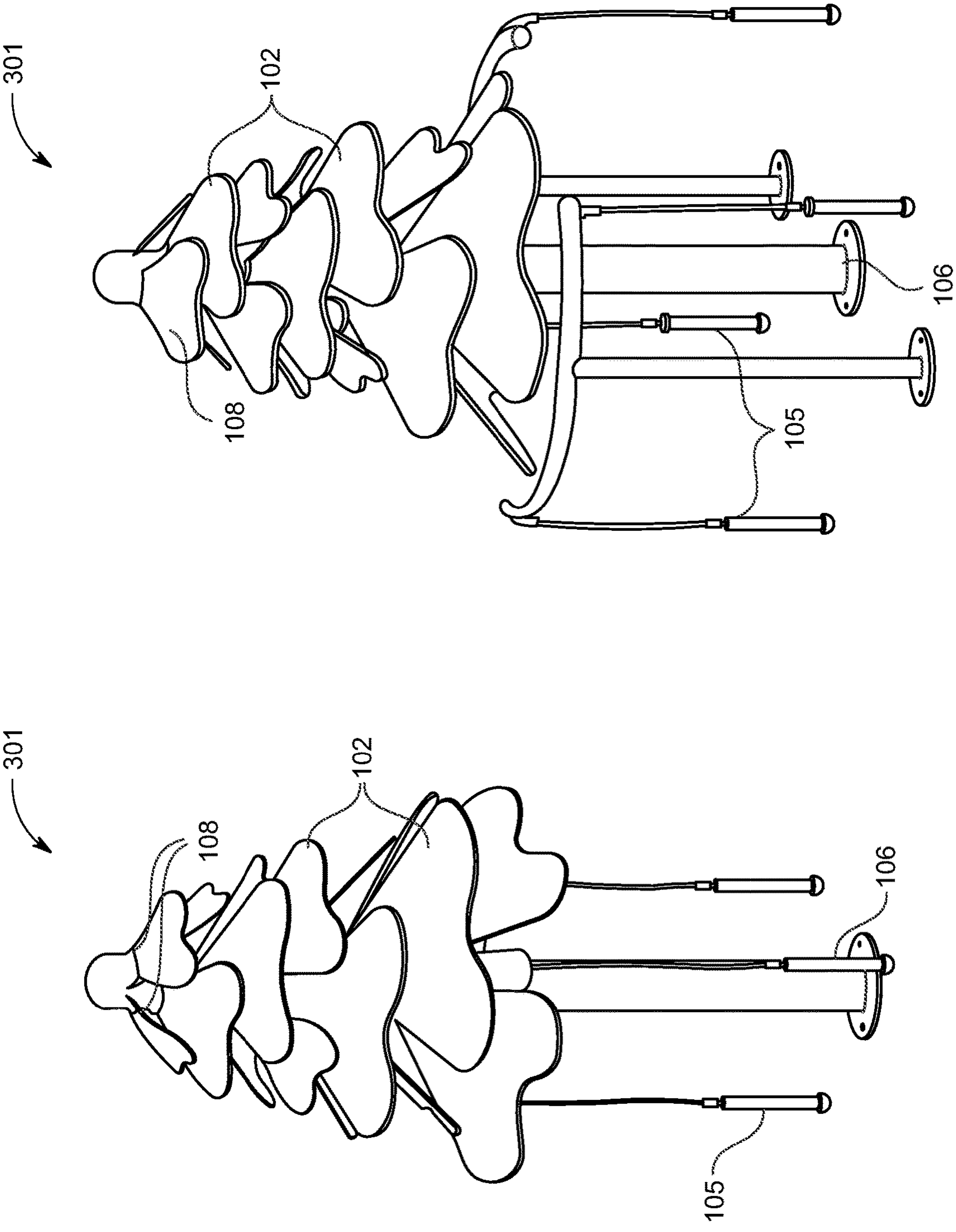
FIG. 6 depicts a tonal musical instrument in the shape of a tree in accordance with one embodiment of the invention.

FIG. 6 depicts a tonal musical instrument in accordance with another embodiment of the present disclosure. In the illustrated embodiment, the tonal musical instrument has the shape and appearance of a tree. In the embodiment illustrated in FIG. 6, the tree-shaped tonal musical instrument 301 comprises several metal plates 102, several non-vibrating guards 108, several mallets 105, and a central support post 106. Each of the several metal plates 102 may be configured to produce a distinct musical note.

Figure 7:
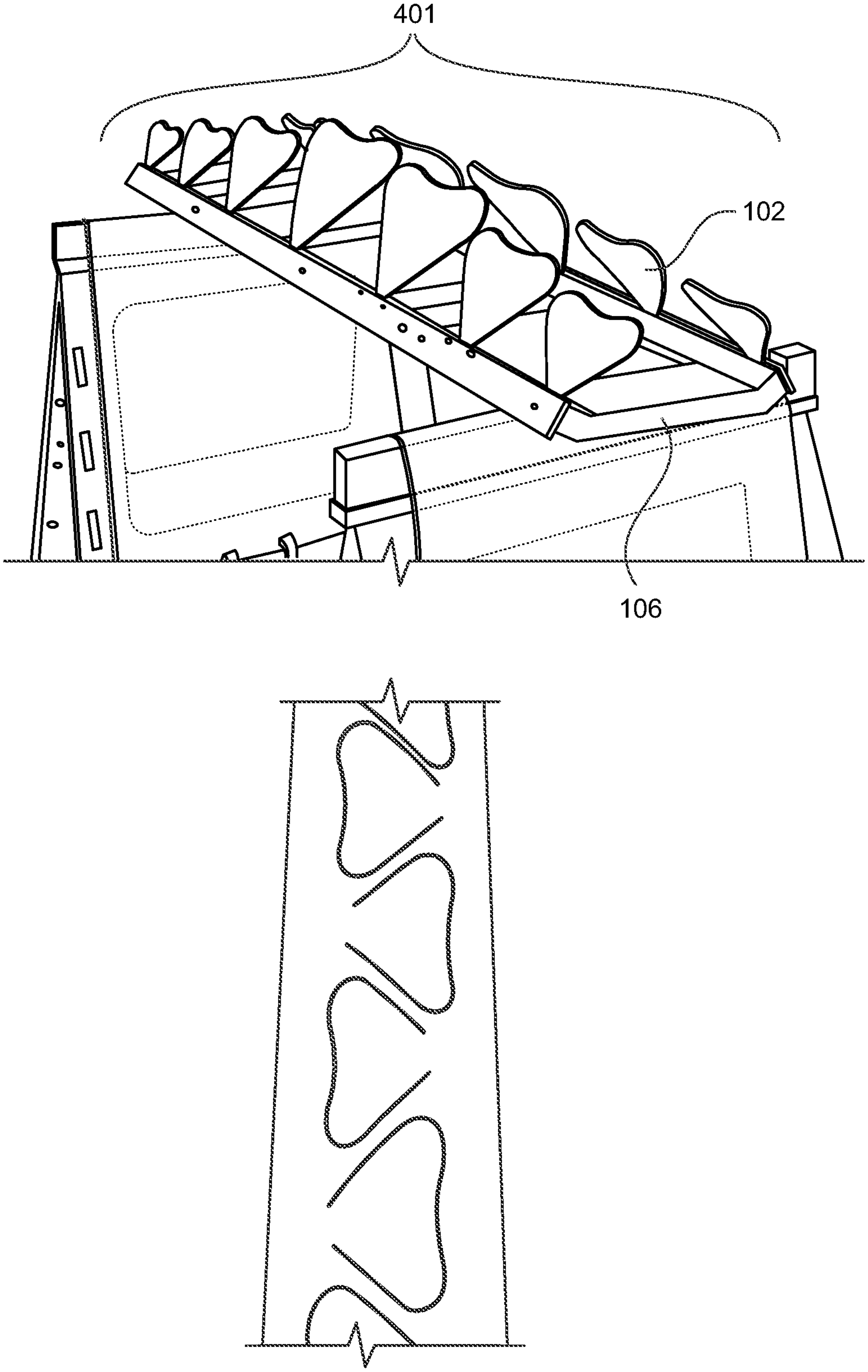
FIG. 7 depicts a tonal musical instrument in the shape of hearts in accordance with one embodiment of the invention.

FIG. 7 depicts a tonal musical instrument in accordance with another embodiment of the present disclosure. In the illustrated embodiment, the tonal musical instrument has the shape and appearance of a series of hearts. In the embodiment illustrated in FIG. 7, the tonal musical instrument 401 comprises several metal plates 102, several non-vibrating guards, and a central support post 106. Each of the several metal plates 102 may be configured to produce a distinct musical note.

Figure 8:
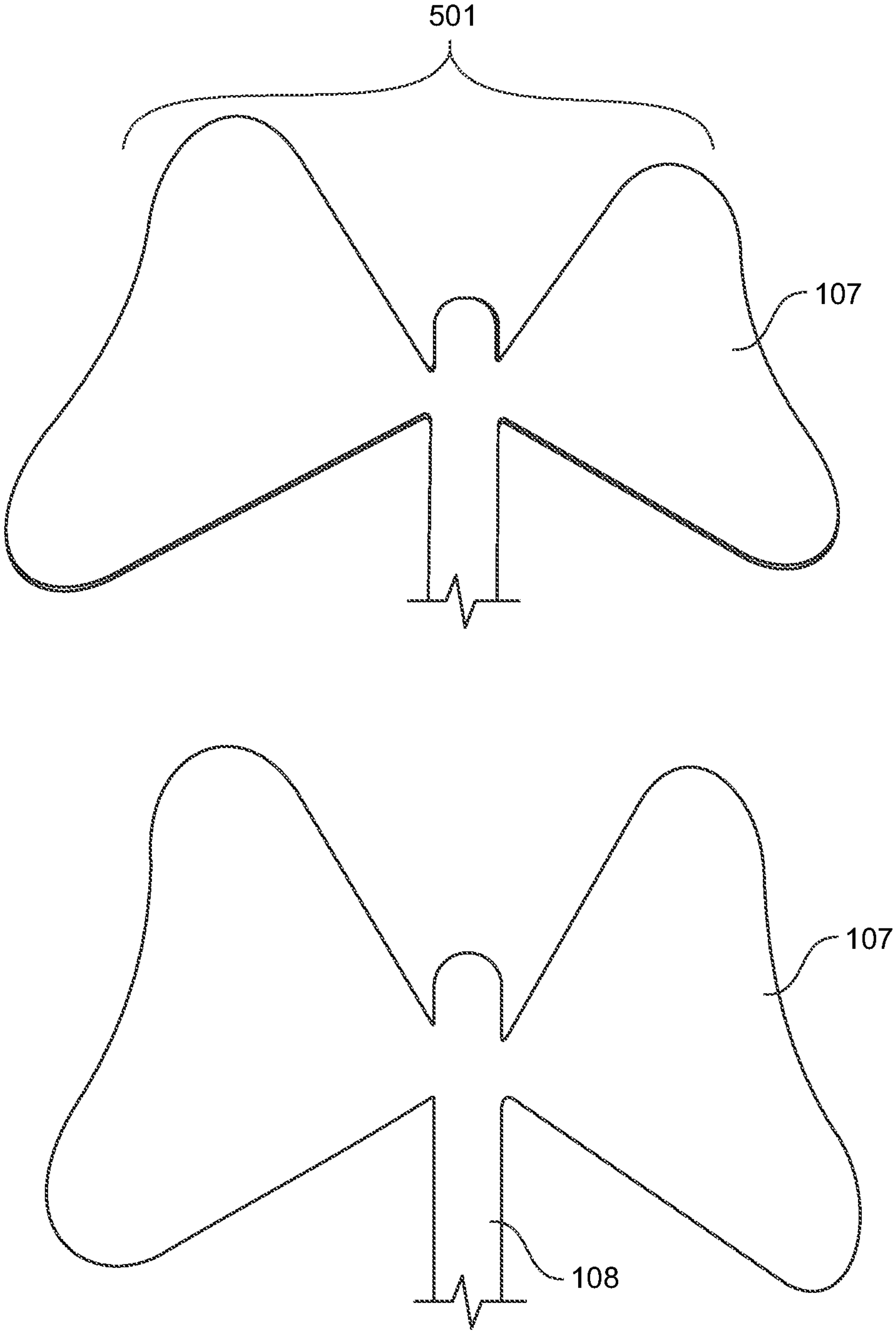
FIG. 8 depicts a tonal musical instrument in the shape of a butterfly in accordance with one embodiment of the invention.

FIG. 8 depicts a tonal musical instrument in accordance with another embodiment of the present disclosure. In the illustrated embodiment, the tonal musical instrument has the shape and appearance of a butterfly. In the embodiment illustrated in FIG. 8, the tonal musical instrument 501 comprises a metal plate 102, with two segments 107, and a handle 108. Each of the segments 107 may be configured to produce a distinct musical note. In some embodiments, the instruments may also be configured to enhance music education. For instance, in some embodiments, each note may be clearly identified on the instrument. For example, one or more of the metal plates or segments of a metal plate may comprise a marking, such as an inscription on the metal plate, indicating the note that is played upon striking a particular area. In some embodiments, the instrument may also contain notes from multiple scales. For example, some instruments may have a Major scale on one metal plate or segment and a corresponding Minor scale on a different metal plate or segment. In addition to fun musical exploration, this may provide education about various musical scales.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures, and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which is obvious to those skilled in the art are intended to be within the scope of the following claims.

What is claimed is:

1. A tonal musical instrument for outdoor installation, the tonal musical instrument comprising:

a central support post, wherein a first end of the support post is configured to be mounted to an outdoor ground surface;

a plurality of metal plates affixed to and extending outward from the support post, each of the plurality of metal plates being tuned to produce a musical note when struck by a user;

wherein the plurality of metal plates are affixed along a vertical stretch of the support post and extend outward from the support post in a plurality of directions, such that the musical instrument replicates a tree.

2. The tonal musical instrument of claim 1, wherein each of the plurality of metal plates also extends downward.

3. The tonal musical instrument of claim 1, further comprising one or more mallets, each of which is attached to the support post by a cable.

4. The tonal musical instrument of claim 1, further comprising one or more mallets and a mallet support structure to which each of the one or more mallets is attached by a cable.

5. The tonal musical instrument of claim 1, in which the plurality of metal plates extend outward in at least three different directions.

6. The tonal musical instrument of claim 1, in which each of the plurality of metal plates has a leaf shape.

7. The tonal musical instrument of claim 1, wherein each of the plurality of metal plates has rounded perimeter edges.

8. The tonal musical instrument of claim 1, in which the plurality of metal plates have the same or substantially the same shape but different sizes.

9. The tonal musical instrument of claim 1, in which the musical notes produced by the plurality of metal plates are from the same scale.

10. The tonal musical instrument of claim 1, wherein each of the plurality of metal plates is configured to maintain its tonal quality without being retuned.

11. The tonal musical instrument of claim 1, wherein each of the plurality of metal plates is configured such that, when struck, the note is sustained for 5 seconds or longer.

12. The tonal musical instrument of claim 1, wherein each of the plurality of metal plates is an aluminum plate.

13. The tonal musical instrument of claim 12, wherein each of the plurality of metal plates is an anodized aluminum plate.

14. The tonal musical instrument of claim 13, wherein the support post is powder-coated steel.

15. The tonal musical instrument of claim 1, wherein the musical instrument has a tonal note accuracy of least 90%.

16. The tonal musical instrument of claim 15, wherein the musical instrument has a tonal note accuracy of at least 95%.

17. The tonal musical instrument of claim 1, wherein a surface of each of the plurality of metal plates is milled so that the plate produces the musical note when struck.

18. The tonal musical instrument of claim 1, wherein the first end of the support post is mounted to an outdoor ground surface.

19. The tonal musical instrument of claim 18, wherein the first end of the support post is permanently mounted to the outdoor ground surface.

* * * * *